United States Patent [19]
Collett

[11] Patent Number: 6,135,395
[45] Date of Patent: Oct. 24, 2000

[54] AIRCRAFT WING LEADING EDGE HIGH LIFT DEVICE WITH SUCTION

[75] Inventor: Edward Collett, Filton, United Kingdom

[73] Assignee: British Aerospace Public Limited Company, Farnborough, United Kingdom

[21] Appl. No.: 09/349,453

[22] Filed: Jul. 8, 1999

Related U.S. Application Data

[63] Continuation of application No. PCT/GB98/01146, Apr. 20, 1998.

[30] Foreign Application Priority Data

Apr. 18, 1997 [GB] United Kingdom .................... 9707888

[51] Int. Cl.$^7$ ..................................................... B64C 21/06
[52] U.S. Cl. ......................... 244/209; 244/208; 244/130; 244/214
[58] Field of Search .................................. 244/208, 209, 244/210, 130, 213, 214

[56] References Cited

U.S. PATENT DOCUMENTS

| | | |
|---|---|---|
| 1,829,616 | 10/1931 | Stalker . |
| 1,917,428 | 7/1933 | Burnelli . |
| 3,917,193 | 11/1975 | Runnels, Jr. . |
| 4,285,482 | 8/1981 | Lewis . |
| 4,398,688 | 8/1983 | Williams . |
| 4,575,030 | 3/1986 | Gratzer . |
| 5,263,667 | 11/1993 | Horstman . |
| 5,348,256 | 9/1994 | Parikh . |
| 5,772,156 | 6/1998 | Parikh et al. . |
| 5,806,808 | 9/1998 | O'Neil . |
| 5,927,656 | 7/1999 | Hinkleman . |

FOREIGN PATENT DOCUMENTS

| | | |
|---|---|---|
| 0 222 421 | 5/1987 | European Pat. Off. . |
| 0 532 093 | 3/1993 | European Pat. Off. . |
| 0 630 807 | 12/1994 | European Pat. Off. . |
| 1 781 303 | 12/1970 | Germany . |
| 675994 | 7/1952 | United Kingdom . |
| 998895 | 7/1965 | United Kingdom . |
| 1164353 | 6/1967 | United Kingdom .................... 244/209 |
| 2232132 | 6/1967 | United Kingdom .................... 244/130 |

OTHER PUBLICATIONS

Wager et al, "Laminar Flow Control Leading–Edge Systems in Simulated Airline Service", *Journal of Aircraft*, vol. 27, No. 3, Mar. 1, 1990, pp. 239–244.

*Primary Examiner*—Peter M. Poon
*Assistant Examiner*—Tien Dinh
*Attorney, Agent, or Firm*—Nixon & Vanderhye P.C.

[57] ABSTRACT

An aircraft wing, wing assembly and method of reducing drag are provided. The wing asembly includes a main wing portion (10) and a leading edge high lift portion (12). The high lift portion is movable between a retracted position in which it generally merges with the main wing portion and a deployed position forwardly thereof. At least a substantial part of an upper surface (22) of the high lift portion is air permeable or perforated and in flow communication with a suction passage (30) in it. In flight, suction may be applied to the suction passage to reduce the chordwise extent of the turbulent boundary layer over the upper or lower wing surface.

17 Claims, 5 Drawing Sheets

US 6,135,395

AIRCRAFT WING LEADING EDGE HIGH LIFT DEVICE WITH SUCTION

This is a Continuation of PCT application PCT/GB98/01146, filed Apr. 20, 1998.

BACKGROUND OF THE INVENTION

1. Field of the Invention

This invention relates to an aircraft wing assembly including a leading edge high lift device and in particular to such assemblies incorporating means for reducing the chordwise extent of the turbulent boundary layer over at least one of the upper and lower wing surfaces. The invention also extends to aircraft including such wing assemblies, to high lift devices for use in such assemblies, and to methods of reducing the drag associated with a wing having a leading edge high lift device.

In this Specification, the terms forward, rearward, upper, lower, chordwise, spanwise, etc., refer to the orientation of an aircraft when in straight and level flight.

2. Discussion of the Prior Art

Great effort and expense has been expended by aircraft designers and aerodynamicists to reduce as much as possible the drag of the aircraft and particularly the drag experienced by the flow of air over the surface or skin of the aircraft. Typical measures have included making the surface very smooth providing the surface with a special texture or microscopic structure to enhance the characteristics of flow over the surface. Another technique is to apply a method of boundary layer control referred to as forced hybrid laminar flow. In this process, a laminar boundary layer is maintained over the wetted surface for as long as possible so as to delay the onset of a turbulent boundary layer. It is not normally feasible to prevent entirely the transmission from a laminar to a turbulent boundary layer, although by delaying its onset the boundary layer can be kept in the laminar regime for longer, thereby leading to a reduction in drag. The process is known as forced hybrid laminar flow as the principle aim is to delay the onset of turbulence rather than to maintain a completely laminar flow over the wetted surface (although we do not intend to exclude this possibility).

In order to achieve this form of boundary layer control, the boundary layer is caused to adhere to the surface by providing a negative pressure over the surface by means of a multiplicity of perforations—of the order of microns in diameter—in the surface. This reduces the growth rate of the boundary layer and thereby delays the onset of the laminar/turbulent transition.

One of the main problems encountered in the design of forced hybrid laminar flow aircraft wings is the need to provide voluminous ducting in the fixed leading edge of the wing to provide the suction required to draw air through the perforations in the wing surface. The ducting area required encroaches on the space normally occupied by the forward spar of the wing. Shifting the forward spar rearwardly to accommodate such ducting has tremendous implications in terms of the increased weight of the wing. Furthermore, for a wing with a leading edge slat, the area conventionally occupied by the extension/retraction and guide mechanisms for the slats would now be occupied by the voluminous ducting. Accordingly proposals to date for a leading edge slat design for a wing with forced hybrid flow over its upper surface have reverted to the Kruger flap which involves providing a hinge at the lower forward extremity of the fixed leading edge or "D nose" of the main wing and making a portion of the underside of the "D nose" hingeable downwards and forwards. However Kruger flaps are not as aerodynamically efficient as slats.

A need therefore exists for a wing assembly which incorporates a high lift device and a provision for forced hybrid laminar flow, but which does not compromise the structural design of the main wing portion and which does not have the weight penalties referred to above.

SUMMARY OF THE INVENTION

Accordingly, in one aspect of this invention, there is provided an aircraft wing assembly including a main wing portion and a leading edge high lift portion movable between a retracted position in which it generally merges with the main wing portion and a deployed position forwardly thereof, wherein at least a substantial part of an exposed upper surface of said high lift portion is air permeable or perforated and in flow communication with a suction passage associated with said leading edge portion, whereby in flight, suction may be applied to said suction passage to at least reduce the chordwise extent of the turbulent boundary layer over at least one of the upper and a lower wing surface.

In another aspect, this invention provides an aircraft incorporating a wing assembly as defined above.

In a further aspect, this invention provides a leading edge high lift device for use with a main wing portion for being moved between a retracted and a deployed position, wherein at least a substantial part of an upper surface of the high lift device is air permeable or perforated and in flow communication with a suction passage of said high lift device, whereby in flight, suction may be applied to cause a negative pressure difference to at least reduce the chordwise extent of the turbulent boundary layer over at least one of the upper and a lower wing surface.

In yet another aspect, this invention provides a method of reducing the drag associated with an aircraft wing having a leading edge high lift device, which method comprises providing a substantial part of an exposed upper surface of the high lift device with an air permeable or perforated surface and applying suction through said surface to at least reduce the chordwise extent of the turbulent boundary layer on at least one of the upper and a lower wing surface.

Whilst the invention has been defined above, it extends to any inventive combination of the features set out above or in the following description.

BRIEF DESCRIPTION OF THE DRAWINGS

The invention may be performed in various ways and, by way of example only, an embodiment thereof and various modifications will now be described in detail, reference being made to the accompanying drawings, in which.

DETAILED DISCUSSION OF PREFERRED EMBODIMENT

Figure 1:
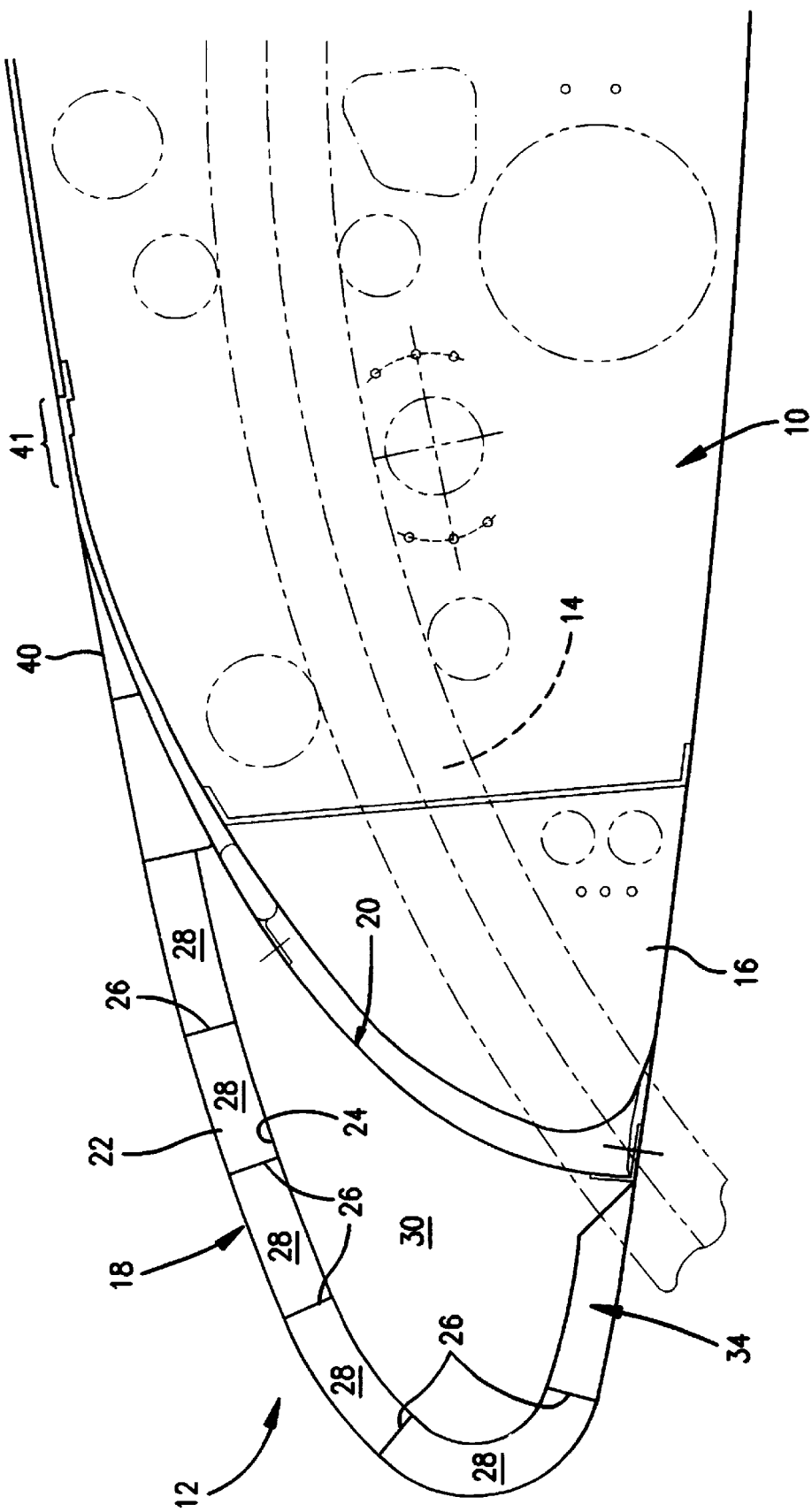
FIG. 1 is a section view through the forward part of a wing assembly in accordance with this invention, with the leading edge slat retracted, taken at a section part way along the wing.

Referring to the Figures, the wing assembly comprises a relatively fixed main wing portion 10 and a relatively moveable leading edge slat 12 mounted on the main wing portion 10 by means of curved track extension/retraction mechanisms shown generally at 14, for movement between the position shown in FIG. 1 in which the leading edge slat 12 merges generally smoothly with the main wing portion 10 and a high lift, deployed, configuration in which it is extended forwardly and downwardly to increase the camber and effective surface area of the wing and thus the lift produced. It will be seen from FIG. 1 that the D nose portion 16 of the main wing is of relatively small transverse section and that some of this area is occupied by the extension/retraction mechanism.

In this arrangement, boundary layer control is effected by applying suction through the leading edge slat 12 rather than to the main wing portion 10. Thus the ducting and services required for the boundary layer control (with the exception of the suction telescope or telescopes to be described below), can be located primarily in the leading edge slat 12, although in other arrangements this may be supplemented by providing perforations and suction in the fixed leading edge.

Figure 4:
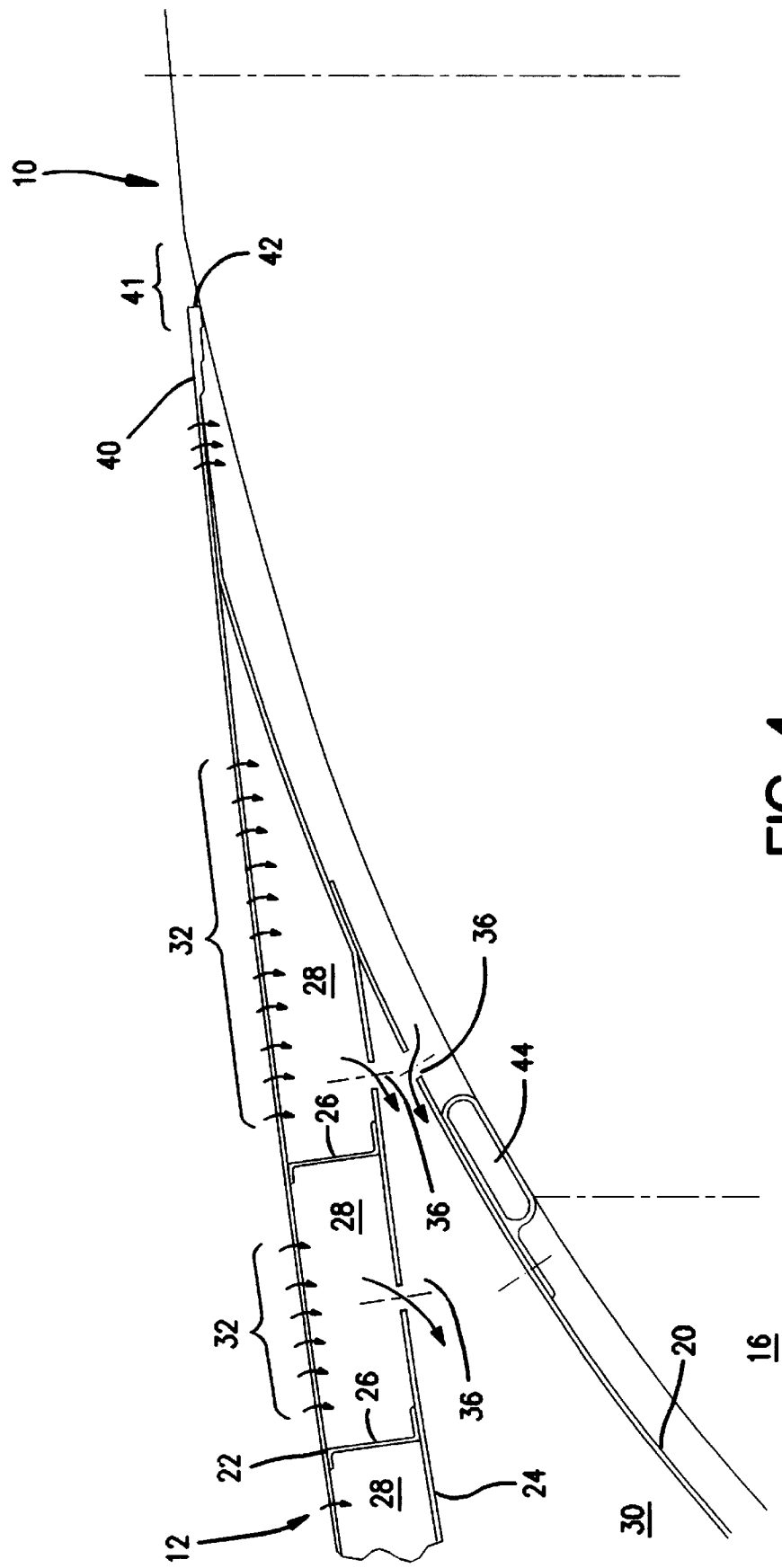
FIG. 4 is a detailed view showing the interface between the trailing edge of the leading edge slat and the main body portion.

The leading edge slat 12 comprises a double-walled forward section 18 of generally convex form and a rearward surface 20 of generally concave form. The double-walled construction comprises an outer surface 22 and an inner surface 24 interconnected by elongate generally spanwise webs 26 to define a series of air suction chambers 28 internally of the outer skin. The inner surface 24 together with the rearward surface 20 together define an air suction duct 30. As seen more particularly in FIG. 4, the outer skin has perforations 32 over a substantial portion of its surface, apart from the lower portion 34 (see FIG. 1)—(although this could be perforated if required). Each of the chambers 28 communicates with the air suction duct through a series of orifices or air transfer ports 36. The sizes of the air transfer ports 36 can be selected to provide a required pressure differential profile in the chordwise direction of the wing. It would also be possible to adjust the pressure in the spanwise direction by providing suitable webs to sub-divide the chambers 28.

Figure 5:
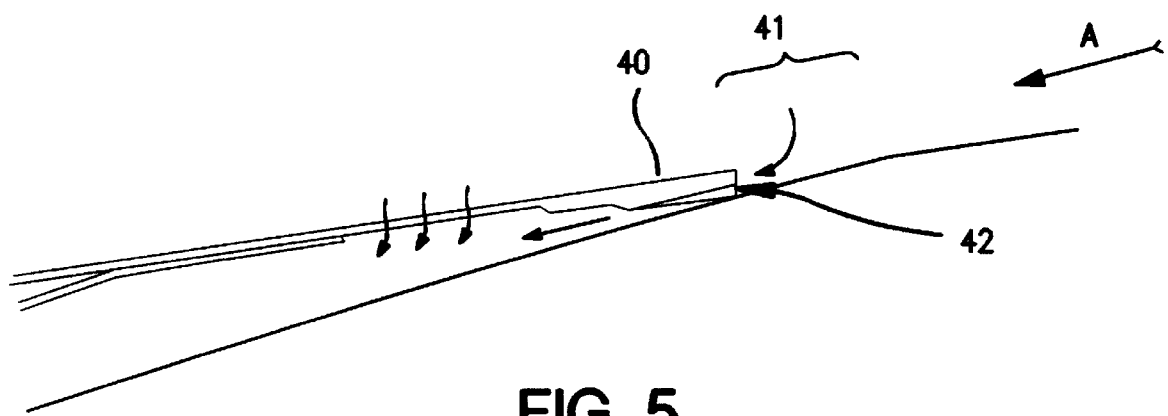
FIG. 5 is an enlarged view of the trailing edge portion.
Figure 6:
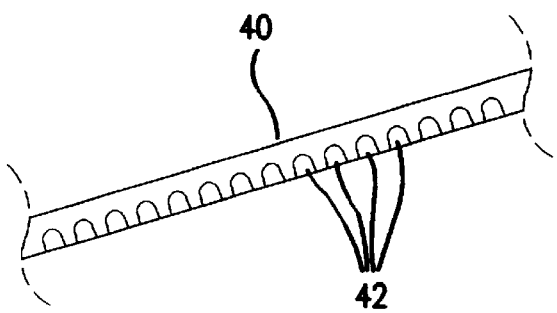
FIG. 6 is a view looking forwardly on the trailing edge portion on lines VI—VI of FIG. 5.

Referring again specifically to FIG. 4, the trailing edge 40 of the leading edge slat 12 is specially machined adjacent its interface with the main wing portion to provide a series of channels or grooves 42 which communicate with the space defined between the rearward surface 20 of the slat and the forward portion of the main wing surface, and which define with the surface of the main wing portion a series of suction ports, as can be seen in FIGS. 5 and 6. The slat includes a seal strip 44 to seal the gap between the slat 12 and the main wing portion 10; and the rearward surface 20 of the slat includes air transfer ports 36 to create suction in the space between the slat 12 and the main wing portion 10 above the seal strip 44. This arrangement allows suction to be provided at the line of contact 41 between the trailing edge of the slat and the main wing portion, thus reducing the possibility of turbulence being initiated at the interface.

Thus, in normal cruise flight, with the slat 12 retracted, suction is applied to the air suction duct 30 to provide the required pressure profile over the surface exposed leading edge and upper surfaces of the slat 12, and adjacent the interface 41 between the trailing edge 40 of the slat 12 and the main wing portion 10 to defer the onset of the transition from laminar to turbulent flow.

Figure 2:
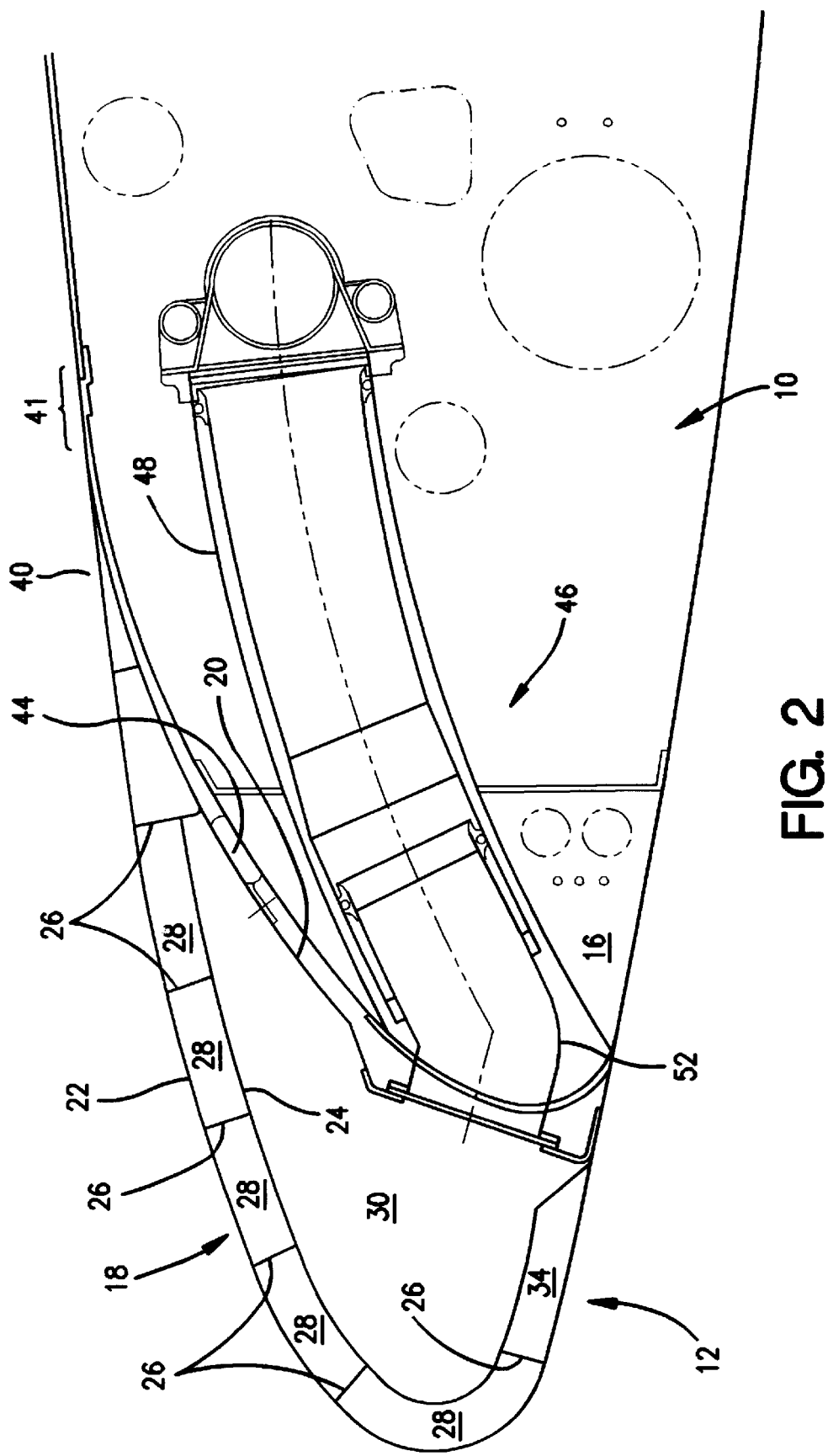
FIG. 2 is a view similar to FIG. 1 but showing the suction telescope at the wing root region.
Figure 3:
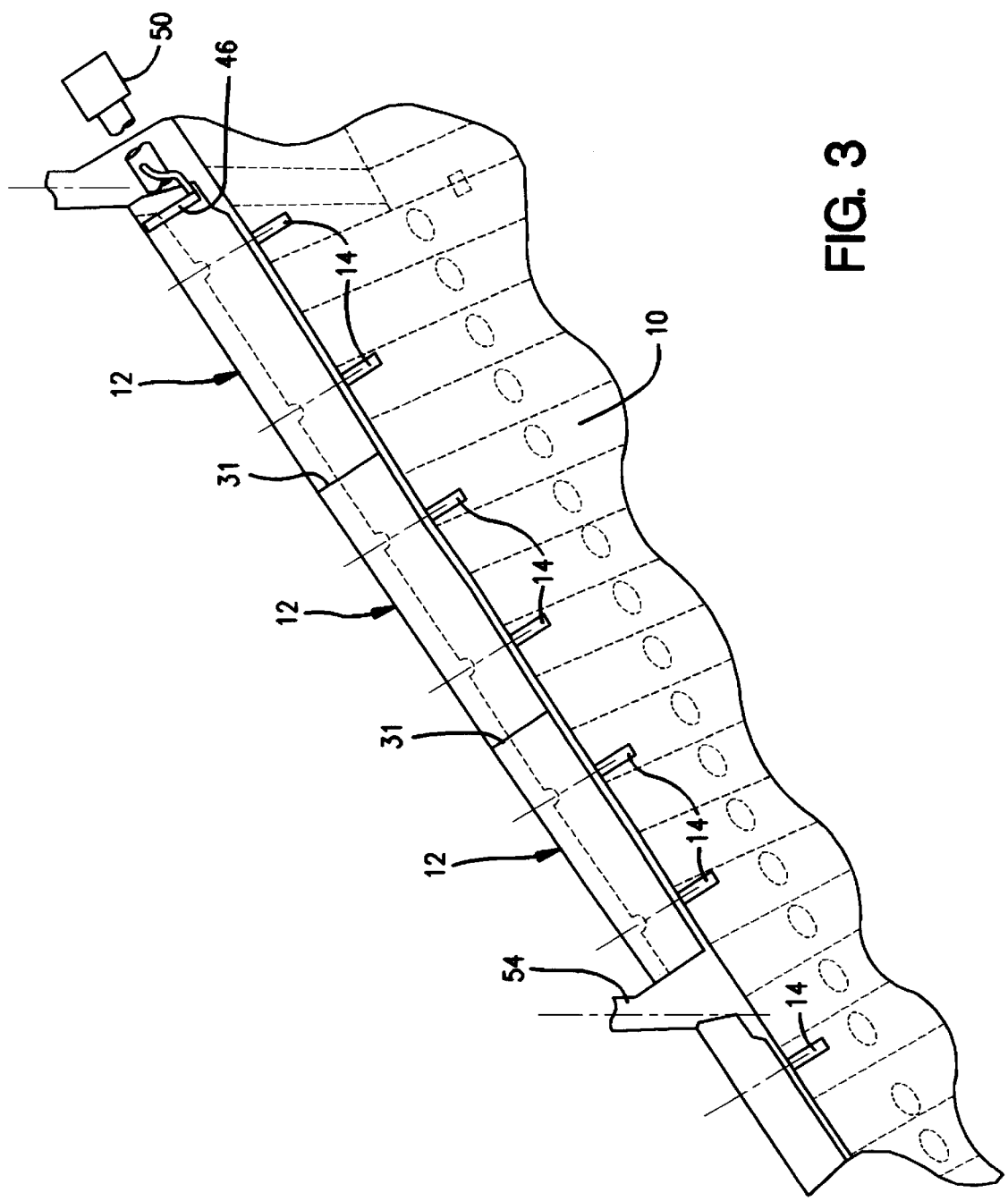
FIG. 3 is a top plan view on the in-board leading portion of the port wing of an aircraft incorporating the assembly of FIGS. 1 and 2.

The suction may be applied in various ways, one example being shown in FIGS. 2 and 3. Here, the air suction duct 30 on the innermost slat 12 includes a suction telescope 46 curved to be concentric with the arc of movement of the slat 12 and carrying a relatively fixed portion 48 located within the wing root portion of the aircraft and connected to a suction pump 50, and a relatively moveable portion 52 slidably located in the distal end of the suction telescope 46 and connected in flow communication with the air suction duct 30. Suction can be applied to adjacent slats 12 by means of corresponding openings between suction ducts 30 on adjacent slats sealed by seals 31. The suction may be applied to the outer neighbouring slats 12 by means of hose connections and suitable seals, or a common suction duct may extend spanwise along the D-nose 16 of the wing, which feeds spaced suction telescopes servicing one or more slats 12. In this instance, a suction telescope may be located at the wing pylon point 54. Alternatively the telescope may not be required as suction will typically only be required in cruise flight, when the slat will be retracted. In this case the telescope may be replaced by a docking arrangement which provides sealed communication with the suction source in the retracted condition, and which separates when the slat is deployed, thus providing an arrangement which has a lower weight and complexity than the telescoping arrangement.

We have found that, with the illustrated slat design, it may not be necessary for the perforations to be provided as far back chordwise as in existing proposals. Thus it may be sufficient to provide perforations in the slat possibly with some or no further perforations in the fixed leading edge of the main wing portion 10.

The illustrated embodiments have several further advantages. Due to the geometry of the slat 12 it is possible to provide perforations on the slat which are to the rear of the D-nose 16 of the fixed main wing portion, without requiring significant structural modification of the main wing portion. The slat 12 protects the fixed leading edge of the main wing portion and any damage to the leading edge (e.g. bird strike) will tend to be sustained by the slat rather than the fixed leading edge, which is more difficult to repair. The perforated surface is usually made of stainless steel or titanium and in previous proposals for forced hybrid laminar flow in a fixed leading edge, the incorporation of such material with composites and other materials has proved problematic due to the different structural characteristics of the materials, whereas the slat of this invention may be made of the same material as the perforated surface or of compatible materials.

What is claimed is:

1. An aircraft wing assembly including a main wing portion and a leading edge high lift, portion movable between a retracted position in which it generally merges with the main wing portion and a deployed position forwardly thereof, characterised in that at least a substantial part of an upper surface of said high lift portion is air permeable or perforated and in flow communication with a suction passage associated with said high lift portion, whereby in flight, suction may be applied to said suction passage to at least reduce the chordwise extent of the turbulent boundary layer over at least one of the upper and a lower wing surface.

2. An aircraft wing assembly according to claim 1, including means for controlling the degree of suction at selected points or regions over the upper surface.

3. An aircraft wing assembly according to claim 2, wherein said means for controlling includes a plurality of chambers extending within said high lift portion and in flow communication with the air permeable or perforated part of the upper surface, and said suction passage.

4. An aircraft wing assembly according to claim 3, wherein said means for controlling includes one or more orifice means or restricted passage means associated with one or more of said chambers, for controlling the flow to or from said chambers.

5. An aircraft wing assembly according to claim 3, wherein each of said chambers is elongate and extends generally spanwise.

6. An aircraft wing assembly according to claim 1, including one or more suction pump means for applying suction to said suction passage.

7. An aircraft wing assembly according to claim 6, wherein a said suction pump means is located in said main wing portion and is in flow communication with said high lift portion via extendable suction duct means extending between the main wing portion and the high lift portion.

8. An aircraft wing assembly according to claim 1, including one or more further said high lift portions, the said high lift portions being arranged spanwise with respect to each other, and each high lift portion including a said suction passage in flow communication with a suction passage of at least one other said high lift portion.

9. An aircraft characterised by incorporating a wing assembly according to claim 1.

10. An aircraft wing assembly including a main wing portion and a leading edge high lift portion movable between a retracted position in which it generally merges with the main wing portion and a deployed position forwardly thereof, wherein at least a substantial part of an upper surface of said high lift portion is air permeable or perforated and in flow communication with a suction passage associated with said high lift portion, whereby in flight, suction may be applied to said suction passage to at least reduce the chordwise extent of the turbulent boundary layer over at least one of the upper and lower wing surface, wherein said leading edge high lift portion comprises a slat which includes a trailing edge region which lies in contact with or closely adjacent the main wing portion when said slat is in its retracted position, said assembly further including passage or perforation means for drawing in air or applying suction in the region of an interface between the trailing edge region of said slat and the main wing portion.

11. An aircraft wing assembly according to claim 10, wherein said passage or perforation means includes orifice means in a surface of the slat which faces the main wing portion, said orifice means being in flow communication with said suction passage.

12. An aircraft wing assembly according to claim 11, wherein said passage or perforation means includes a plurality of generally spanwise spaced channels in the trailing edge region of said slat which co-operate with the adjacent surface of the main wing portion, when the slat is in the retracted position, to define a plurality of suction ports at said interface.

13. An aircraft wing assembly according to claim 10, including seal means extending generally spanwise between a rearward facing surface of the slat and the main wing portion to provide a seal therebetween when the slat is in the retracted position.

14. An aircraft wing assembly including a main wing portion and a leading edge high lift portion movable between a retracted position in which it generally merges with the main wing portion and a deployed position forwardly thereof, wherein at least a substantial part of an upper surface of said high lift portion is air permeable or perforated and in flow communication with a suction passage associated with said high lift portion, whereby in flight, suction may be applied to said suction passage to at least reduce the chordwise extent of the turbulent boundary layer over at least one of the upper and lower wing surface, including one or more further said high lift portions, the said high lift portions being arranged spanwise with respect to each other, and each high lift portion including a said suction passage in flow communication with a suction passage of at least one other said high lift portion, in which said flow communication with a suction passage of at least one other said high lift portion takes place via a further seal acting between adjacent high lift portions.

15. A leading edge high lift device for use with a main wing portion for being moved between a retracted and a deployed position, characterised in that at least a substantial part of an upper surface of the high lift device is air permeable or perforated and in flow communication with a suction passage of said high lift device whereby, in flight, suction may be applied to cause a negative pressure difference to at least reduce the chordwise extent of the turbulent boundary layer over at least one of the upper and a lower wing surface.

16. A leading edge high lift device according to claim 15 including a series of generally spanwise spaced channels in a trailing edge region thereof.

17. A method of reducing the drag associated with an aircraft wing having a leading edge high lift device, which method is characterised by providing a substantial part of an exposed upper surface of the high lift device with an air permeable or perforated surface and applying suction through said surface to at least reduce the chordwise extent of the turbulent boundary layer on at least one of the upper and a lower wing surface.

* * * * *